United States Patent
Zhao (10) Patent No.: US 12,410,848 B1
(45) Date of Patent: Sep. 9, 2025

(54) ELECTRIC HEAVY-LOAD PUSH-PULL TOOL

(71) Applicants: Aurora & Gloria Hong Kong Technology Co., Limited, Hong Kong (CN); Yuxuan Zhao, Xi'an (CN)

(72) Inventor: Yuxuan Zhao, Xi'an (CN)

(73) Assignees: Aurora & Gloria Hong Kong Technology Co., Limited, Hong Kong (CN); Yuxuan Zhao, Xi'an (CN)

( * ) Notice: Subject to any disclaimer, the term of this patent is extended or adjusted under 35 U.S.C. 154(b) by 0 days.

(21) Appl. No.: 19/206,694

(22) Filed: May 13, 2025

(30) Foreign Application Priority Data

May 14, 2024 (CN) .......................... 202410593784.7

(51) Int. Cl.
*F16H 1/46* (2006.01)
*F16H 57/10* (2006.01)
F16H 57/08 (2006.01)

(52) U.S. Cl.
CPC ............... *F16H 1/46* (2013.01); *F16H 57/10* (2013.01); *F16H 2057/085* (2013.01)

(58) Field of Classification Search
CPC ....... F16H 1/46; F16H 57/10; F16H 2057/085
See application file for complete search history.

(56) References Cited

FOREIGN PATENT DOCUMENTS

| CN | 102748430 A | * | 10/2012 | |
|----|---|---|---|---|
| CN | 111911102 A | | 11/2020 | |
| CN | 213298715 U | * | 5/2021 | |
| CN | 115450581 A | | 12/2022 | |
| CN | 218624171 U | | 3/2023 | |
| CN | 107558949 B | * | 7/2023 | ............. E21B 23/06 |
| EP | 3203112 A1 | * | 8/2017 | ........... F16H 57/082 |

OTHER PUBLICATIONS

Office Action, Application No. or Publication No. CN202410593784.7, Issued Sep. 30, 2024, 14 pages.

* cited by examiner

*Primary Examiner* — Justin Holmes
(74) *Attorney, Agent, or Firm* — Berkeley Law & Technology Group, LLP (57) ABSTRACT

Provided is an electric heavy-load push-pull tool including a power input unit, a power conversion unit and a power output unit. Through the transmission design of multiple stages of reducers and a planetary roller screw of a downhole operation tool, low-speed and high-torque power output of the motor is realized. The heavy-load push-pull tool provided by the present disclosure can not only provide large-torque thrust force, but also provide large-torque pulling force. A forward direction of a transmission nut is based on a rotation direction of a motor. By controlling the forward rotation or reverse rotation of a transmission shaft of the motor, the forward or backward movement of an operation tool can be realized at low cost through power transmission.

12 Claims, 9 Drawing Sheets

ELECTRIC HEAVY-LOAD PUSH-PULL TOOL

CROSS-REFERENCE TO RELATED APPLICATION

This patent application claims the benefit and priority of Chinese Patent Application No. 202410593784.7 filed with the China National Intellectual Property Administration on May 14, 2024, the disclosure of which is incorporated by reference herein in its entirety as part of the present application.

TECHNICAL FIELD

The present disclosure belongs to the technical field of oil and gas downhole operation tools, in particular to an electric heavy-load push-pull tool.

BACKGROUND

At present, in the development of oil-gas wells, the main production increase method for unconventional oil and gas fields is to segment reservoirs with bridge plugs or packers so as to modify the reservoirs. The bridge plugs or packers are correctly arranged at a preset downhole position by means of setting tools. At present, there are two types of setting tools on the market, including explosive setting tools and non-explosive setting tools.

The main working principle of the explosive setting tool is that the slow-burning power charge is ignited by the primary igniter and the secondary igniter, the slow-burning power charge burns to produce gas to form the high-pressure gas is formed in the closed space, so that the piston is push by the high-pressure gas, and then the hydraulic oil at the other end enters the next stage oil cylinder through the small hole in the intermediate joint: the oil cylinder is provided internally a piston, the pushing rod connected with the piston moves together with the piston after the hydraulic oil pushes the piston to push the adapter: the bridge plugs or packers are deformed permanently or temporarily by the adapter: the bridge plugs or packers are fixed on the inner sleeve of the sleeve by means of deformation, and the sealing rubber or variable diameter metal ring is extruded to achieve sealing.

The powder setting tool has the following disadvantages.

Firstly, control and use of explosives: the explosives, such as detonators and powder, are controlled substances which bring potential safety hazards during the transportation and storage of explosives. In addition, during use of explosives, there may be a risk of explosion due to improper operation of technicians, resulting in disability to individuals and thus bringing great safety hazards to enterprises and individuals.

Secondly, product quality of explosives: the power and effect of powder have a certain relationship with environmental factors. If the powder gets damp during storage thereof, the power of combustion and explosion of powder will be greatly reduced. If the powder is not stored properly or the underground environment is harsh, the powder will also become damp, thus affecting the construction progress.

Thirdly, the limited driving force brought by explosives: the driving force brought by combustion of powder is limited. For example, the maximum thrust of the Baker 20 setting tool is 24 tons. Moreover, the energy efficiency of powder will be greatly reduced if the powder is affected by the environment. If special circumstances, such as casing patches, are encountered, the thrust brought by powder setting tools will not be satisfied.

Fourthly, design defects of powder setting tools: since the powder setting tool uses a slow-burning power charge to provide thrust, when the powder setting tool is raised from the wellhead, there must be a pressure relief port configured for releasing gas which has two hidden dangers: first, if the pressure relief screw and the sealing ring of the pressure relief port are not installed in place before the setting tool is used, the external pressure in the wellbore may enter the tool to push the piston in the first stage oil cylinder after the tool enters the well, causing the setting tool to work ahead of time, resulting in setting or pre-setting of the bridge plug/packer; and second, after the powder setting tool is used, it is necessary to carry out pressure relief on the ground to discharge the high-pressure gas generated by the combustion of the power charge out of the tool, and the tool is disassembled and maintained. In the process of pressure relief on the ground, due to the different proficiency degrees of operators, there will be the possibility of high-pressure gas injury accidents.

Fifthly, the short maintenance cycle of the powder setting tool: the powder setting tool needs to be maintained after each use. Each maintenance often takes 20-40 minutes, which is laborious.

The hydraulic setting tool has the following disadvantages: a) since the hydraulic pump works at high pressure, there will be a risk of high pressure leakage, causing that the service life of the hydraulic pump is short: b) the maintenance cycle has been greatly improved compared with that of the powder setting tool, but the maintenance times are still slightly more compared with electric setting tools: c) the hydraulic setting tool cannot be suitable for steel wire operations; and d) since the hydraulic setting tool needs to rely on a certain amount of external pressure, the use effect of the hydraulic setting tool is not good if the pressure in the wellbore is zero.

SUMMARY

The technical problem solved by the present disclosure is to provide an electric heavy-load push-pull tool which can generate a high-torque thrust force or pulling force in oil-gas wells and is safe and reliable to use.

The present disclosure is realized through the following technical scheme.

An electric heavy-load push-pull tool includes a power input unit, a power conversion unit and a power output unit.

The power input unit includes a motor connected with an external power source, a output shaft of the motor being connected with the power conversion unit through a coupling.

The power conversion unit includes a reducer arranged inside a reducer housing. The reducer is provided with multiple stages of planetary reducers: each of the multiple stages of planetary reducers includes a sun gear, a planetary plate, a planetary carrier and a plurality of planetary gears, each of the plurality of planetary gears is meshed with a gear groove formed in an inner wall of the reducer housing, the sun gear is fixed on a sun gear transmission shaft or the planetary plate, and clearance control shafts coaxial with the sun gear transmission shaft are arranged between planetary plates; and power is input from the sun gear transmission shaft to a first stage of planetary reducer and output from the planetary carrier of a last stage of planetary reducer to a reducer output shaft.

The power output unit includes a power output housing. An inner wall of the power output housing is provided with guide rails, the power output housing is internally provided with a planetary roller screw: the planetary roller screw includes a lead screw and a transmission nut, the transmission nut is internally provided with a plurality of planetary rollers, the lead screw is connected with the reducer output shaft through a spline connecting sleeve, and the transmission nut is further connected with feather keys embedded in the guide rails; and a hollow connecting sleeve is fixedly connected with the transmission nut, and is driven by the transmission nut to move axially so as to provide thrust force or pulling force for an operation tool.

Furthermore, the output shaft of the motor is connected with the sun gear transmission shaft through the coupling, a bearing assembly including deep groove ball bearings and thrust bearings being arranged between the sun gear transmission shaft and the reducer and a pressure ring is further arranged between the bearing pack and the reducer.

The clearance control shafts are arranged between adjacent planetary plates, both end faces of each of the clearance control shafts are spherical surfaces, and an end face of the sun gear transmission shaft is also a spherical surface: contact between the sun gear transmission shaft and a corresponding one of the clearance control shafts and contact between the clearance control shafts both are point contact.

A ball bearing pack is further arranged between the reducer output shaft and the reducer.

Furthermore, one end of the spline connecting sleeve is connected with the reducer output shaft through a spline, an other end of the spline connecting sleeve sleeves on the lead screw; and a retaining ring is arranged on the spline connecting sleeve.

Each of both ends of the transmission nut is formed with a groove matched with one side of a corresponding one of the feather keys, the one side of the corresponding one of the feather keys is arranged in the groove, and an other side of the corresponding one of the feather keys is arranged in a corresponding one of the guide rails.

The transmission nut and the hollow connecting sleeve are in threaded connection and are fixed by a fixing part.

Furthermore, the spline connecting sleeve is externally provided with a fixing ring, one side of the fixing ring is provided with one of the thrust bearings and a bearing backing ring, and a screw clamping key is inserted between the one of the thrust bearings and the lead screw for fixation; and an other side of the fixing ring is provided with an other of the thrust bearings, a spline fixing bearing and a spline fixing ring.

A tail end of the lead screw is nested into an oil-free bushing and fixed to the oil-free bushing by a retaining ring.

The power output housing is internally provided with crash cushions at both ends of each of the guide rails respectively.

Power transmissions of the power input unit, the power conversion unit and the power output unit is as follows.

Power generated by the motor is transmitted to the sun gear transmission shaft through the output shaft of the motor and the coupling, so that the power is transmitted to the power conversion unit.

The sun gear transmission shaft drives a sun gear of the first stage of reducer to rotate and then drives planetary gears meshed with the reducer housing to rotate, movement of the planetary gears drives a planetary plate of a next stage of reducer to rotate, and the planetary plate drives a sun gear fixed on the planetary gear to rotate: after the power is transmitted through one stage of reducer, power torque is increased accordingly: when the power is transmitted to the last stage of planetary reducer, the planetary gear rotates and drives the reducer output shaft to rotate through a planetary carrier so as to provide low-speed and high-torque power output.

The reducer output shaft is connected with the spline connecting sleeve through the spline, and the power is transmitted to the power output unit: the lead screw receives twisting force provided by the spline connecting sleeve and rotates to drive the transmission nut to move axially. Guided by the feather keys, the transmission nut only moves axially on the lead screw along the guide rails.

A forward direction of the transmission nut is based on a rotation direction of the motor, and forward rotation or reverse rotation of the motor transmission shaft drives the transmission nut to move forward or backward through power transmission.

The hollow connecting sleeve is provided with a plurality of operation tool connecting interfaces, and the operation tool is fixedly connected with the hollow connecting sleeve; and the hollow connecting sleeve fixedly connected with the transmission nut is driven by the transmission nut to move axially so as to apply axial pulling force or thrust force to the operation tool.

Furthermore, the motor is further connected with a motor control unit. The motor control unit includes a control module, and a communication module, a collection module, a motor drive module and a power supply module which are connected with the control module.

The communication module is configured for real-time communication between the motor control unit and an external control panel.

The control module is configured to receive a control signal of the external control panel through the communication module to send instructions to each module, and feed motor operation parameters back to the external control panel.

The collection module is configured to collect operation parameters including rotation speed, rotation direction, voltage and current of the motor in real time, and send the operation parameters to the control module.

The motor drive module is configured to receive instructions from the control module and adjust the operation parameters of the motor.

The power supply module is configured to convert supply voltage into operation voltage required by each module and the motor.

Furthermore, the control module is able to obtain relative positions of the transmission nut and the hollow connecting sleeve based on the rotation speed of the motor and a lead of the lead screw; and when the transmission nut and the hollow connecting sleeve move to set positions, the control module sends instructions to the motor drive module, stopping the motor.

The motor is arranged in a motor cushioning sleeve, both ends of an outer wall of the motor cushioning sleeve is formed with sealing ring grooves into which motor cushioning sleeve sealing rings are arranged.

The motor and the motor cushioning sleeve are arranged inside a power input housing, and the motor is connected with the motor input housing through a motor fixing hole and a fixing part.

The power input housing is formed with sealing ring grooves into which power input housing sealing rings are arranged.

Compared with the prior art, the present disclosure has the following beneficial effects.

According to the heavy-load push-pull tool provided by the present disclosure, through the transmission design of multiple stages of reducers and the planetary roller screw of the downhole operation tool, low-speed and high-torque power output of the motor is realized. A tool with an outer diameter of 96 mm can output 30 tons of thrust and pulling force. A tool with an outer diameter of 76 mm can output 19 tons of thrust and pulling force. A tool with an outer diameter of 56 mm can output 13 tons of thrust and pulling force. The power output of downhole electric operation is greatly improved. A high-reliability and large-torque electric downhole operation tool is given.

The heavy-load push-pull tool provided by the present disclosure can not only provide large-torque thrust force, but also provide large-torque pulling force. A forward direction of a transmission nut is based on a rotation direction of a motor. By controlling the forward rotation or reverse rotation of a transmission shaft of the motor, the forward or backward movement of an operation tool can be realized at low cost through power transmission. Compared with the existing setting tool, the heavy-load push-pull tool by the present disclosure is matched with operation tools adapted to specific scenes, so that the operation range of the downhole tool is greatly expanded.

According to the heavy-load push-pull tool provided by the present disclosure, in order to meet the seismic requirement of frequent vibration of bridge plug perforating integration, the reducer in the power conversion unit and the planetary roller screw in the power output unit are designed for seismic resistance, so that the stability and reliability of the instrument can be ensured, and the maintenance cycle of the tool is greatly improved. The heavy-load push-pull tool in the present disclosure is maintained only after two hundred times of downhole operations are completed. Compared with the existing setting tool that needs to be maintained after thirty times of downhole operations, the maintenance period of the heavy-load push-pull tool in the present disclosure is greatly improved, so that the maintenance cost is greatly reduced. Furthermore, by designing the cushion space between the clearance control shafts, the crash cushions and other measures, the present disclosure can ensure that the vibration generated by the explosion of perforating bullets during bridge plug perforating integration construction does not cause damages to instruments.

DETAILED DESCRIPTION OF THE EMBODIMENTS

The following is a further detailed description of the present disclosure with reference to specific embodiments which are illustrative and not restrictive to the present disclosure.

The present disclosure provides an electric heavy-load push-pull tool. The electric heavy-load push-pull tool mainly includes a power input unit, a power conversion unit and a power output unit which are packaged in a casing from up to down. One end of the casing is connected with a perforating gun through an upper end joint, and the other end of the casing is connected with a bridge plug/packer through an adapter. The electric heavy-load push-pull tool can serve as a setting tool, or be connected with other downhole operation tools, and can be used as a punching operation tool or a side well coring operation tool.

The power input unit includes a motor connected with an external power source. An output shaft of the motor is connected with the power conversion unit through a coupling.

The power conversion unit includes a reducer arranged in a reducer housing. The reducer is provided with multiple stages of planetary reducers. The planetary reducer includes a sun gear, a planetary plate, a planetary carrier and a plurality of planetary gears. The planetary gear is meshed with a gear groove formed in an inner wall of the reducer housing. The sun gear is fixed on a sun gear transmission shaft or the planetary plate. A clearance control shaft coaxial with the sun gear transmission shaft is arranged between the planetary plates. Power is input from the sun gear transmission shaft to the first stage of planetary reducer and finally output from the planetary carrier of the last stage of planetary reducer to a reducer output shaft.

The power output unit includes a power output housing, wherein an inner wall of the power output housing is provided with guide rails, the power output housing is internally provided with a planetary roller screw: the planetary roller screw comprises a lead screw and a transmission nut, the transmission nut is internally provided with a plurality of planetary rollers, the lead screw is connected with the reducer output shaft through a spline connecting sleeve, and the transmission nut is further connected with feather keys embedded in the guide rails; and a hollow connecting sleeve is fixedly connected with the transmission nut, and is driven by the transmission nut to move axially so as to provide thrust force or pulling force for an operation tool.

Furthermore, the power transmission of the power input unit, the power conversion unit and the power output unit is as follows.

Power generated by the motor is transmitted to the sun gear transmission shaft through the output shaft of the motor and the coupling, so that the power is transmitted to the power conversion unit.

The sun gear transmission shaft drives a sun gear of the first stage of reducer to rotate and then drives planetary gears meshed with the reducer housing to rotate, movement of the planetary gears drives a planetary plate of a next stage of reducer to rotate, and the planetary plate drives a sun gear fixed on the planetary gear to rotate: after the power is transmitted through one stage of reducer, power torque is increased accordingly: when the power is transmitted to the last stage of planetary reducer, the planetary gear rotates and drives the reducer output shaft to rotate through a planetary carrier so as to provide low-speed and high-torque power output.

The reducer output shaft is connected with the spline connecting sleeve through the spline, and the power is transmitted to the power output unit: the lead screw receives twisting force provided by the spline connecting sleeve and rotates to drive the transmission nut to move axially, wherein guided by the feather keys, the transmission nut only moves axially on the lead screw along the guide rails.

The forward direction of the transmission nut is based on a rotation direction of the motor, and forward rotation or reverse rotation of the motor transmission shaft drives the transmission nut to move forward or backward through power transmission.

The hollow connecting sleeve is provided with a plurality of operation tool connecting interfaces, and the operation tool is fixedly connected with the hollow connecting sleeve; and the hollow connecting sleeve fixedly connected with the transmission nut is driven by the transmission nut to move axially so as to apply axial pulling force or thrust force to the operation tool.

Furthermore, in order to enhance accurate control for the electric heavy-load push-pull tool, the motor is further connected with a motor control unit. The motor control unit includes a control module, and a communication module, a collection module, a motor drive module and a power supply module which are connected with the control module.

The communication module is configured for real-time communication between the motor control unit and an external control panel.

The control module is configured to receive a control signal of the external control panel through the communication module to send instructions to each module, and feed motor operation parameters back to the external control panel.

The collection module is configured to collect operation parameters including rotation speed, rotation direction, voltage and current of the motor in real time, and send the operation parameters to the control module.

The motor drive module is configured to receive instructions from the control module and adjust the operation parameters of the motor.

The power supply module is configured to convert supply voltage into operation voltage required by each module and the motor.

The following describes the units in detail in conjunction with accompanying drawings and embodiments.

Figure 1:
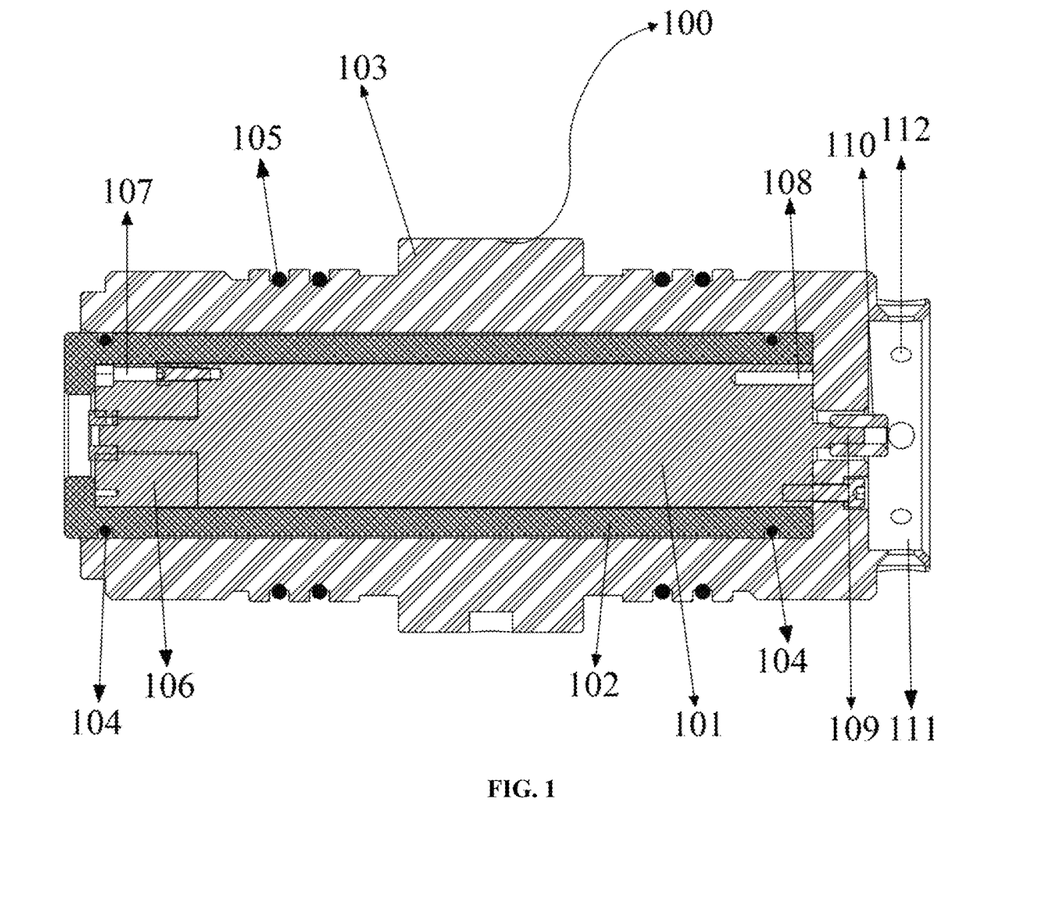
FIG. 1 is a structure diagram of a power input unit according to the present disclosure.
Figure 2:
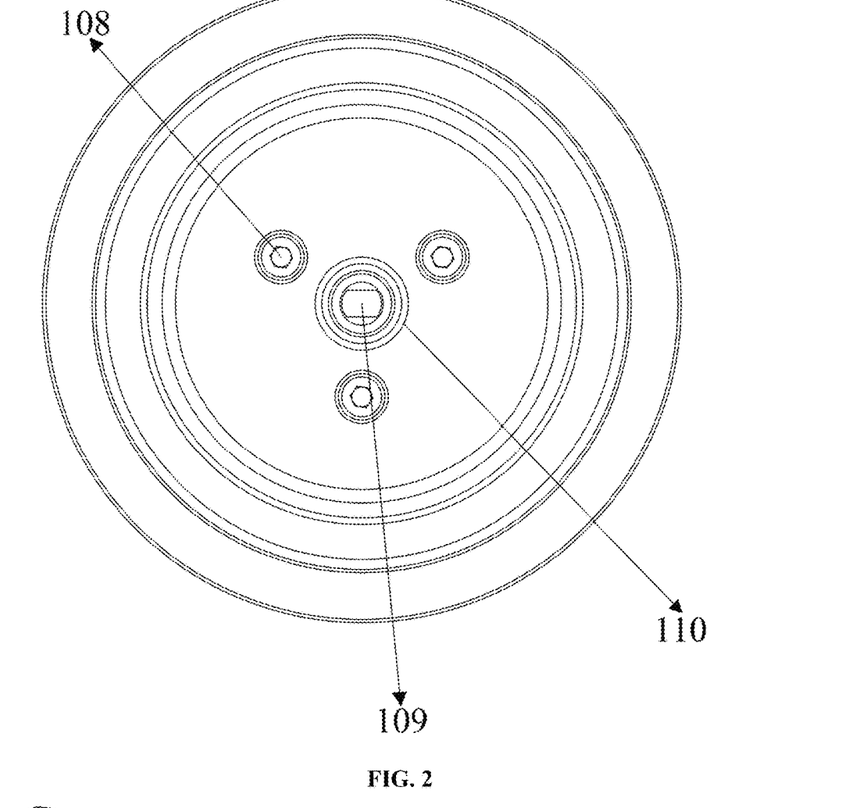
FIG. 2 is a top schematic diagram of the power input unit according to the present disclosure.

Referring to FIG. 1 and FIG. 2, in the power input unit 100, power generated by the motor 101 is output through the output shaft 109 of the motor. The output shaft 109 of the motor is connected with the sun gear transmission shaft inside the power conversion unit through the coupling 110 for power transmission.

The motor 101 can adopt a brushless direct current motor. Since the brushless direct current motor operates in a self-controlled manner, they do not require a frequency conversion speed regulation mode for heavy-load starting, and cannot cause oscillation or out of step due to sudden load change. Compared with a brushed motor, the brushless direct current motor has higher energy efficiency and longer service life. Moreover, the brushless motor is easier to be maintained, so that the frequency and cost of motor replacement are reduced.

An embodiment of the power input unit is given below:

The power input unit 100 includes a motor 101, a motor cushioning sleeve 102, a power input housing 103, motor cushioning sleeve sealing rings 104, power input housing sealing rings 105, motor fixing holes 108, a output shaft 109 of the motor, a coupling 110, a flange 111 and fixing screws 112.

The motor 101 is arranged inside the motor cushioning sleeve 102.

Each of both ends of an outer wall of the motor cushioning sleeve 102 is formed with sealing ring grooves, and the motor cushioning sleeve sealing ring 104 is arranged inside the sealing ring groove.

The motor 101 and the motor cushioning sleeve 102 are placed in the power input housing 103. The motor and the power input housing 103 are fixed together through the flange 111, the fixing screws 112, three motor fixing holes 108 and three screws fitting with the three fixing holes 108.

The power input housing 103 is formed with four sealing ring grooves. The power input housing sealing rings 105 are sequentially placed inside the sealing ring grooves to ensure that both ends of the power input unit are sealed.

Furthermore, in order to ensure that the motor does not rotate before starting, or the motor is braked if necessary, the power input unit 100 is further provided with a brake mechanism 106. The brake mechanism 106 is arranged at an upper end of the motor 101 and aligned with the brake fixing hole 107. The brake mechanism 106 and the motor 101 are fixed together through screws.

The brake mechanism is a non-essential component, which is used for security reasons. The brake mechanism has a main function that the motor 101 is stopped rotating to stop power output when necessary: Various existing motor stop modes can be selected.

A brake implementation based on electromagnets is given below: When braking, the brake mechanism adsorbs onto the upper end of the motor to lock a motor shaft, so that the motor shaft cannot rotate freely: After energization, the polarity of the magnet convers and is bounced, so that the motor shaft can rotate freely.

Referring to FIG. 3 to FIG. 8, the power conversion unit includes a reducer 200 and a reducer housing 209. The reducer 200 and the reducer housing 209 are connected through a fixing bolt at an upper end of the reducer and a fixing bolt at a lower end of the reducer.

Figure 3:
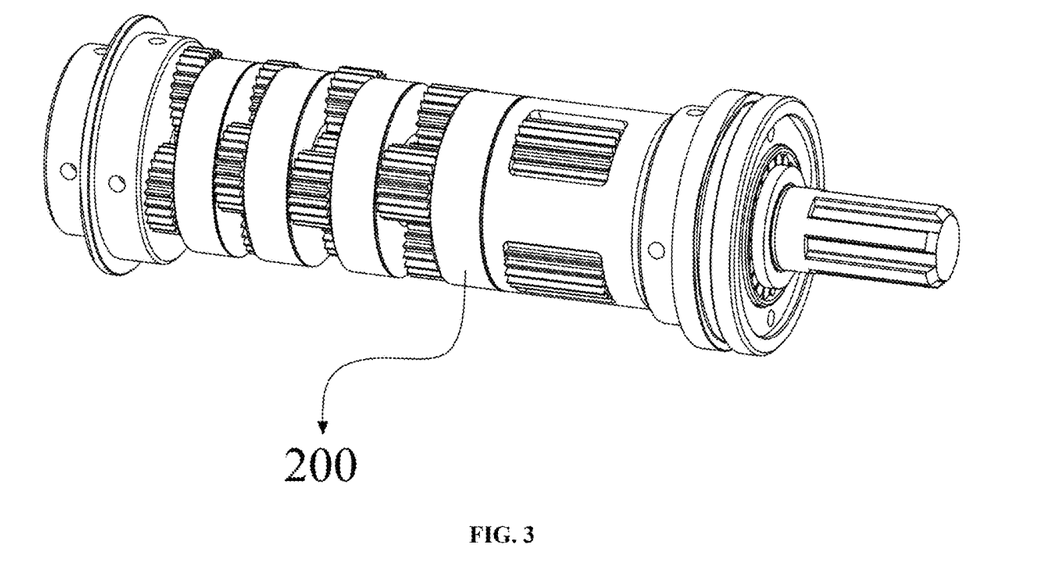
FIG. 3 is a schematic diagram of a reducer of a power conversion unit according to the present disclosure.
Figure 5:
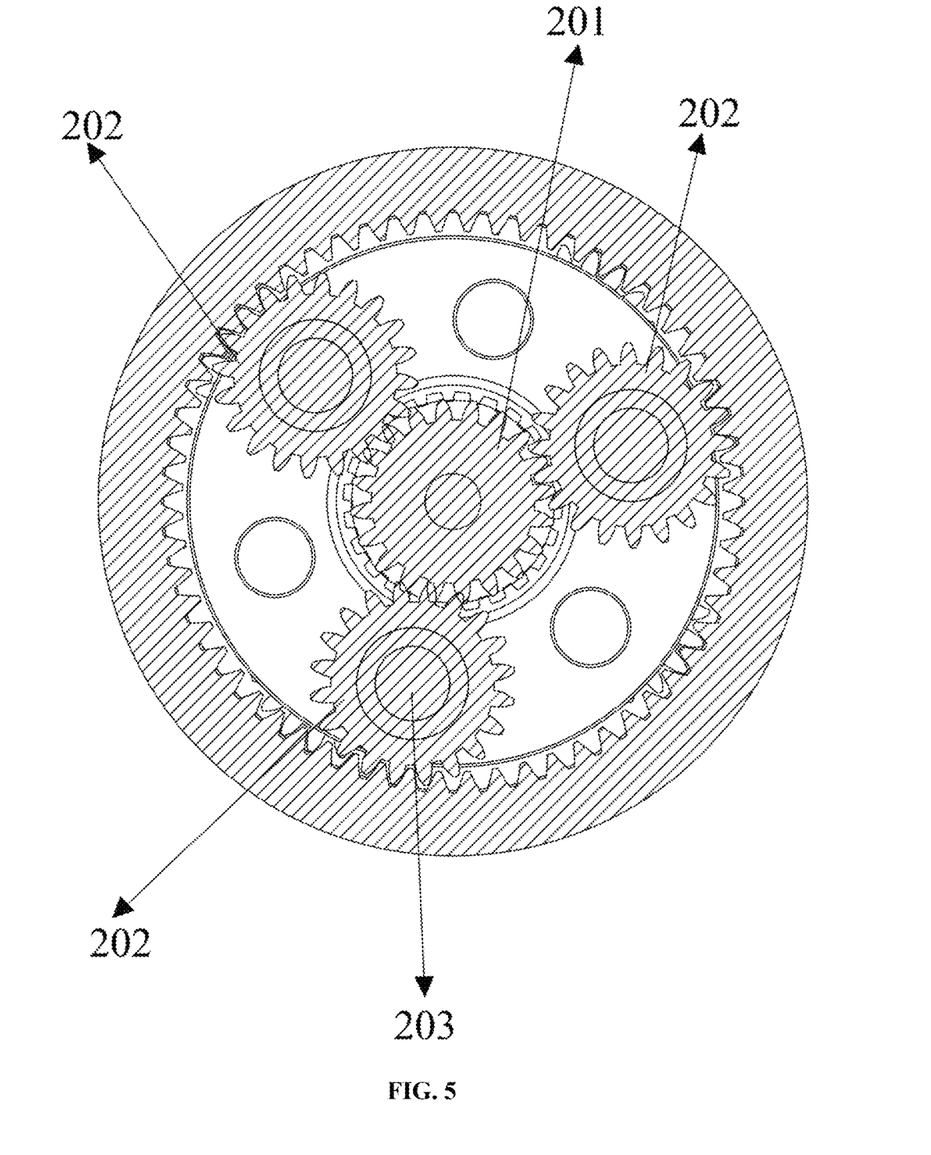
FIG. 5 is a first structure diagram of a sun gear of the reducer according to the present disclosure.
Figure 6:
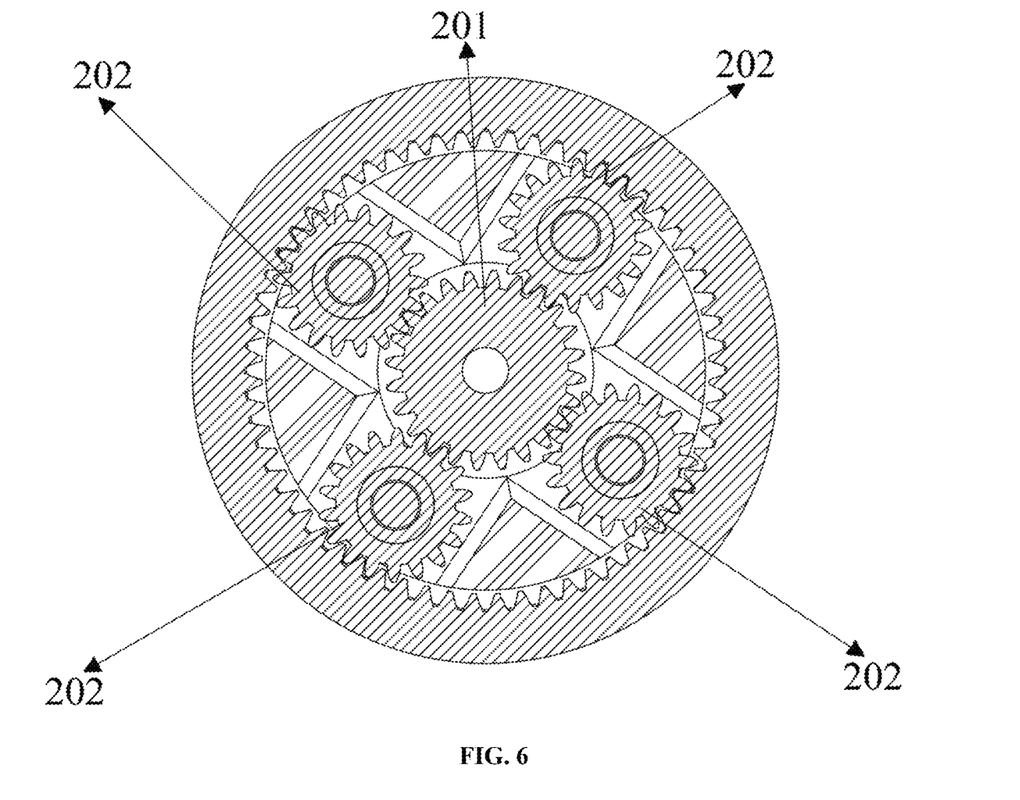
FIG. 6 is a second structure diagram of the sun gear of the reducer according to the present disclosure.

The reducer 200 includes multiple stages of planetary reducers connected in series. In the embodiment of the present disclosure, five stages of planetary reducers are connected in series. Wherein, each of the first stage of reducer to the fourth stage of reducer include one sun gear 201 and three planetary gears 202. The fifth stage of reducer includes one sun gear 201 and four planetary gears 202. The sun gear 201 of the first stage of reducer is connected with the sun gear transmission shaft 235, and each of the sun gears 201 of the second stage of reducer to the fifth stage of reducer is connected with a planetary plate.

Figure 7:
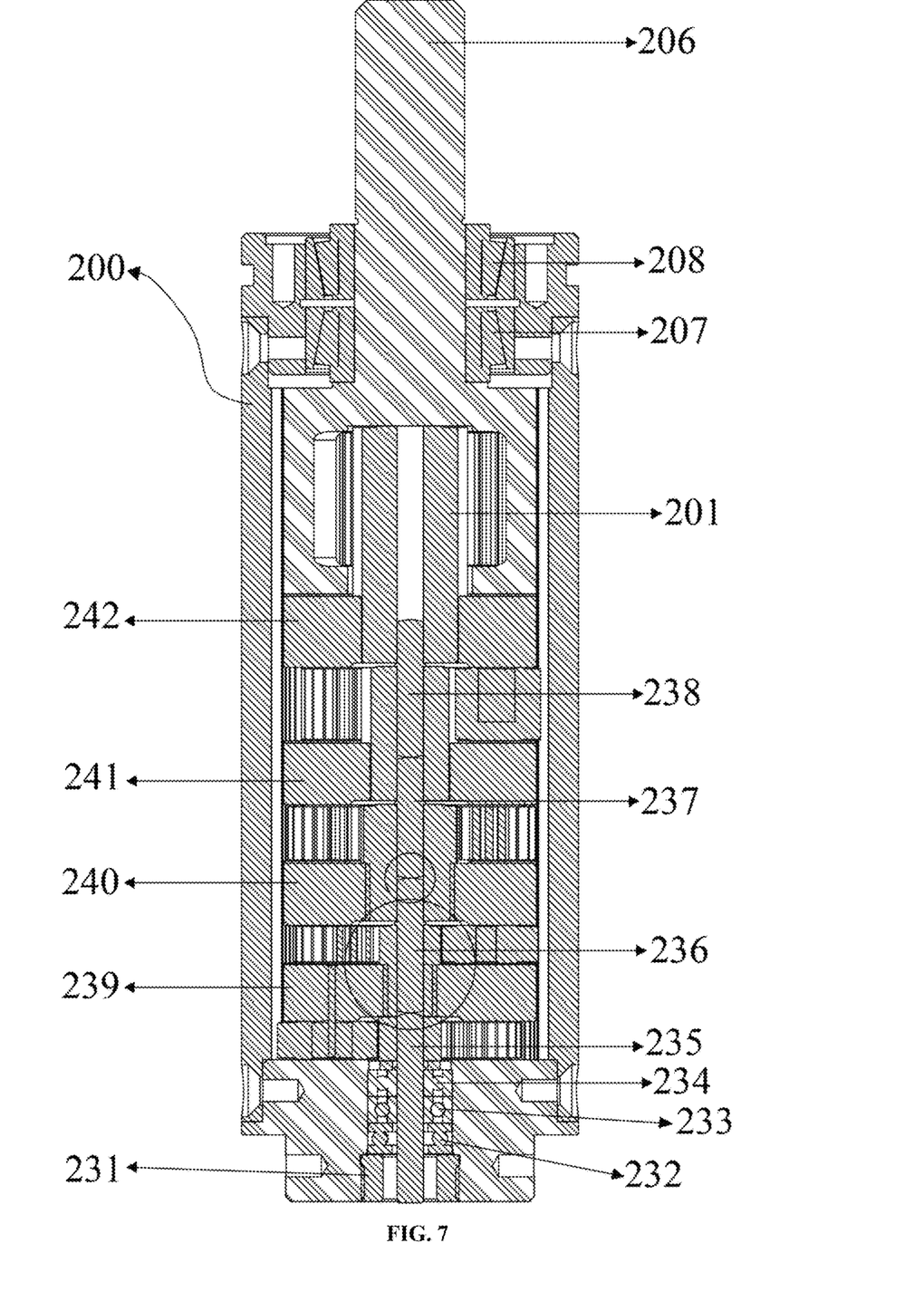
FIG. 7 is a section view of the reducer according to the present disclosure.

The composition of the planetary carrier is as follows. Each of the planetary gears of the planetary reducer is formed with a transmission hole 203. The transmission holes 203 of a stage of reducer is connected with the planetary plate of a next stage of reducer or the reducer output shaft 206 through fixing pins. With the movement of the planetary gears, the next stage of planetary plate or the reducer output shaft is driven to rotate.

One transmission thrust bearing 232 and two deep groove ball bearings (a first deep groove ball bearing 233 and a second deep groove ball bearing 234) are sequentially arranged on the sun gear transmission shaft 235 for fixing the position of the sun gear transmission shaft 235 and reducing the frictional resistance of the sun gear transmission shaft. The bearings are fixed at the upper end of the reducer 200 through a pressure ring 231.

A plurality of coaxial clearance control shafts (a first clearance control shaft 236, a second clearance control shaft 237 and a third clearance control shaft 238) are arranged between planetary plates (a first planetary plate 239, a second planetary plate 240), a third planetary plate 241 and a fourth planetary plate 242) of the reducer. Each of the upper and lower ends of the clearance control shaft is a spherical surface, and the mutual contact between the spherical surfaces is point contact. Compared with surface contact, the point contact is smaller in transmission resistance. In order to deal with axial acceleration generated in the perforating explosion process, the spherical surfaces of the clearance control shafts are designed to retain a certain gap between the clearance control shafts to achieve a cushioning effect. Therefore, the clearance control shafts can effectively control the gap between the planetary gear and the planetary plate, so that the friction is reduced, the transmission efficiency is improved, and the power loss is reduced.

The reducer output shaft 206 is connected with the power output unit through ball bearings (including an upper ball bearing 207 and a lower ball bearing 208).

The power transmission of the reducer 200 is given below:

The power output by the output shaft 109 of the motor is transmitted to the sun gear transmission shaft 235 through the coupling 110.

Figure 4:
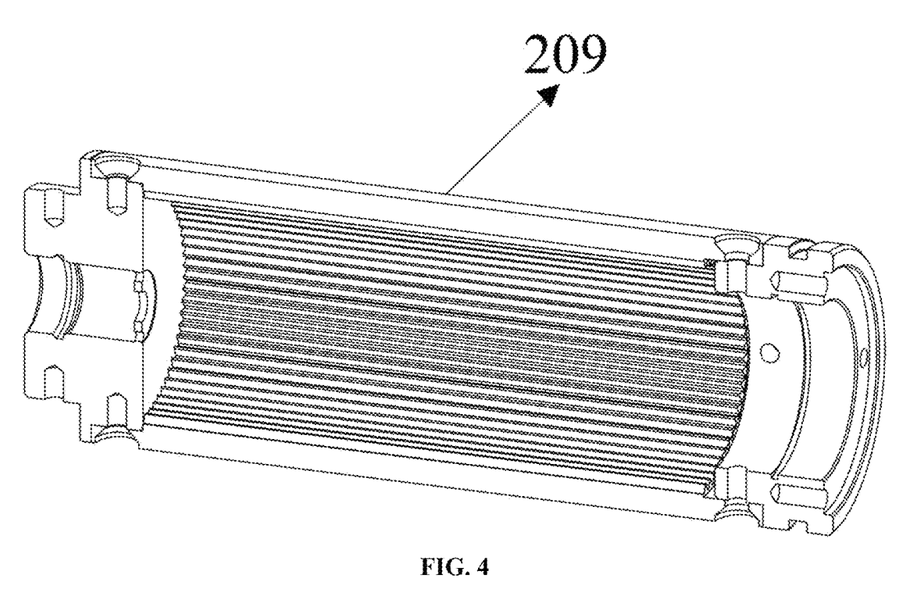
FIG. 4 is a schematic diagram of a reducer housing of the power conversion unit according to the present disclosure.

In the first stage of reducer, the sun gear transmission shaft drives a first sun gear to rotate, and three planetary gears are arranged around the first sun gear. As the first sun gear is rotatably meshed with three planetary gears and the planetary gears are rotatably meshed with the gear grooves of the reducer housing 209, the planetary gears start to rotate around the first sun gear. With the movement of the three planetary gears, the first planetary plate 239 is driven to rotate to transmit the power to the second stage of reducer.

The second stage of reducer, the third stage of reducer and the fourth stage of reducer have the same structure and power transmission. With the power transmission, the second planetary plate 240, the third planetary plate 241, and the fourth planetary plate 242 respectively rotate for transmission.

With the rotation of the fourth planetary plate 242, a fifth sun gear fixed on the fourth planetary plate 242 starts to rotate. Four planetary gears are arranged around the fifth sun gear. As the four planetary gears are rotatably meshed with the gear grooves in the inner wall of the reducer housing 209, the four planetary gears start to rotate around the fifth sun gear. The transmission hole is formed in the middle of each of the four planetary gears, and the transmission holes of the planetary gears and the reducer output shaft 206 are fixed together through fixing pins. With the movement of the four planetary gears, the reducer output shaft 206 is driven to rotate to provide low-speed and high-torque power output (the torque multiple is about 1:4000).

Figure 8:
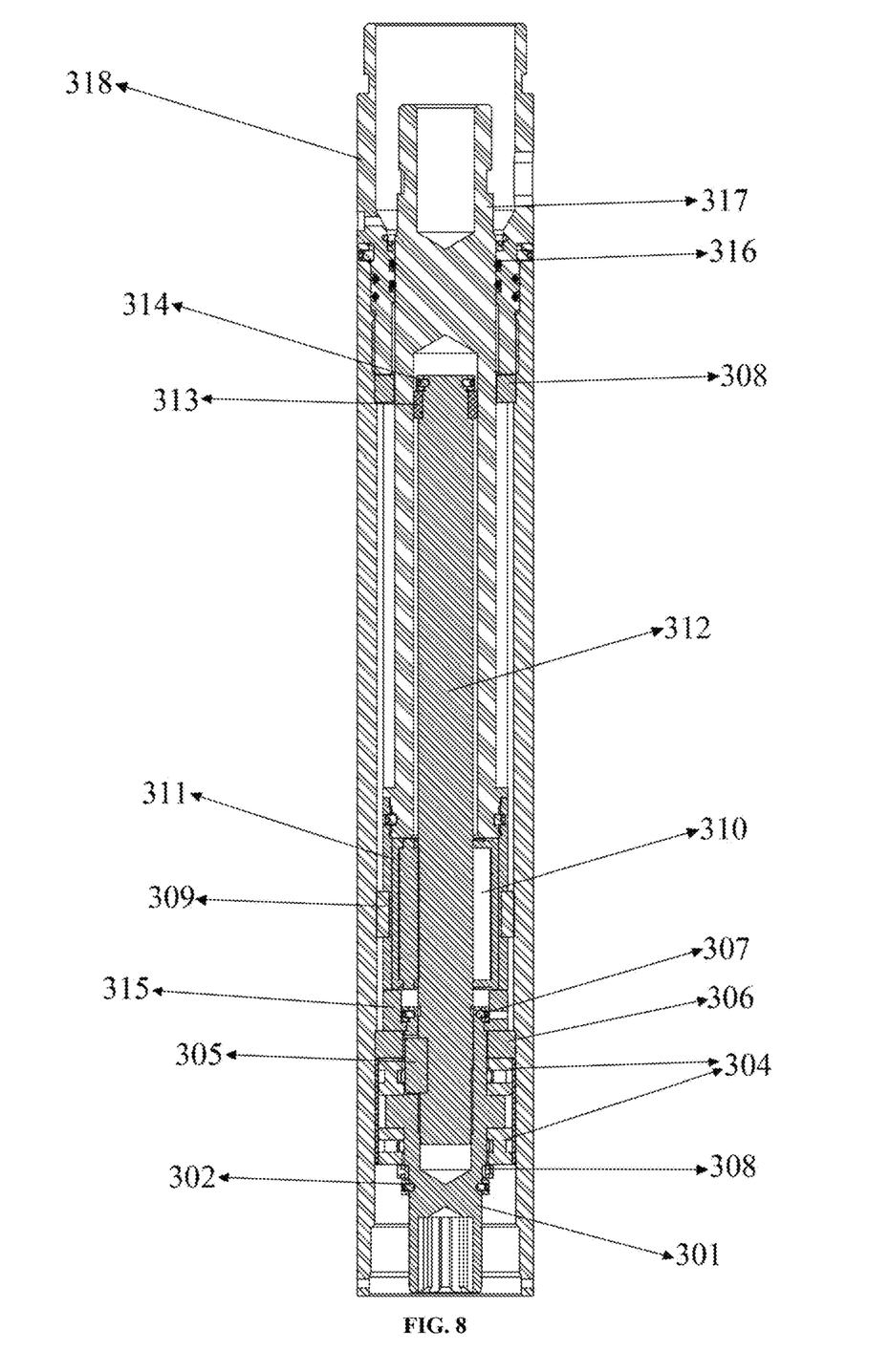
FIG. 8 is a section view of a power output unit according to the present disclosure.

A lower end of the reducer output shaft 206 which is in a spline design is connected with the spline connecting sleeve 301 at an upper end of the power output unit to transmit the power to the power output unit.

Figure 9:
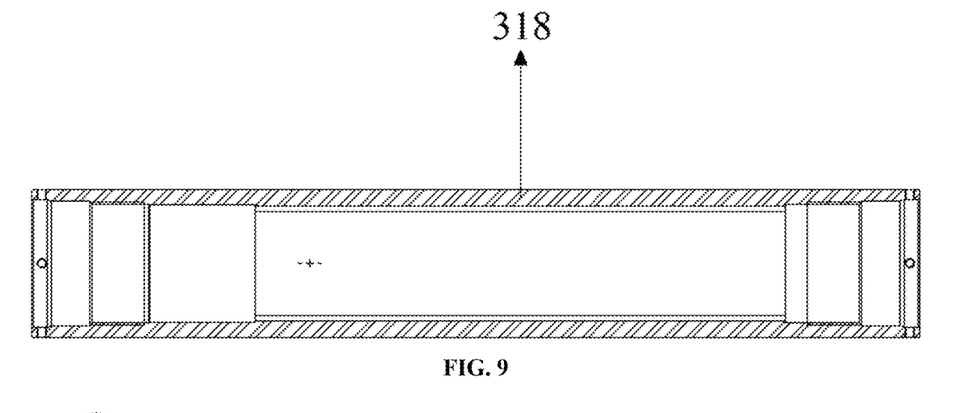
FIG. 9 is a first schematic diagram of a power output housing according to the present disclosure.
Figure 10:
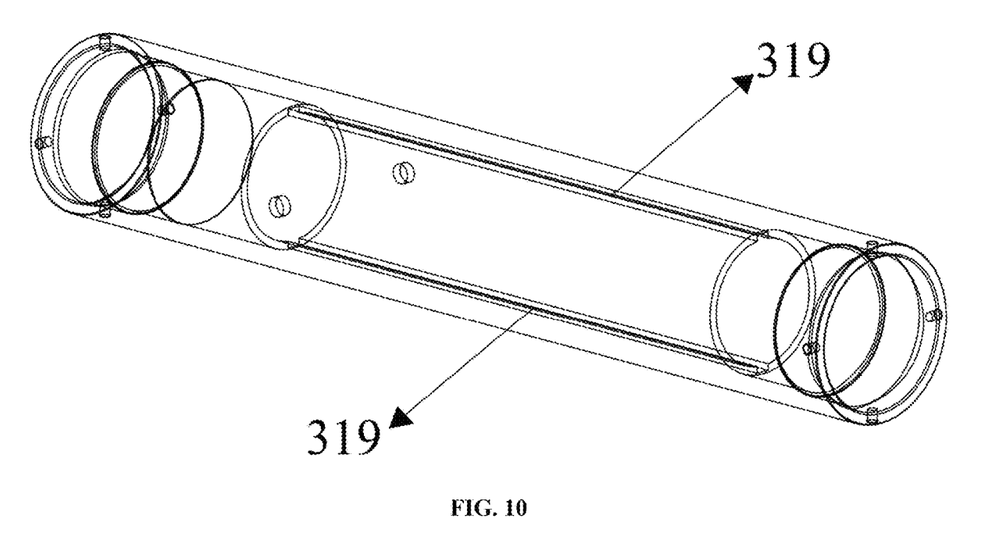
FIG. 10 is a second schematic diagram of the power output housing according to the present disclosure.
Figure 11:
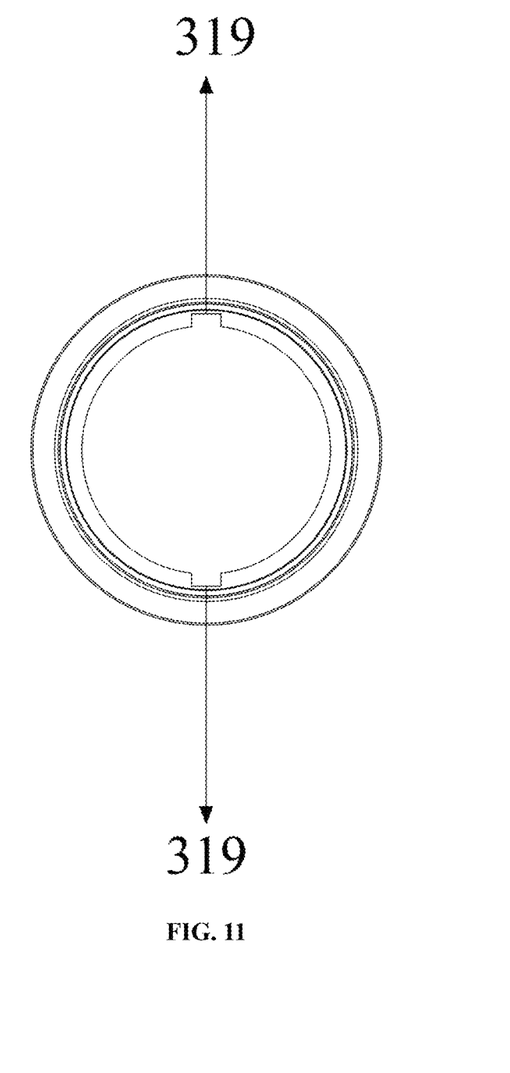
FIG. 11 is a schematic cross-sectional view of the power output housing according to the present disclosure.

Referring to FIG. 9 to FIG. 11, the power output unit adopts a planetary roller screw to transmit the power, and is connected with an operation tool through a hollow connecting sleeve, so as to apply an axial pulling force or thrust force for the operation tool, so that a bridge plug or a packer can be extruded for deformation and setting, or other downhole operations are carried out.

The power output unit mainly includes a spline connecting sleeve 301, a planetary roller screw: a hollow connecting sleeve 317 and a power output housing 318. The inner wall of the power output housing 318 is formed with a guide rail 319.

In order to adapt the forces of axial and radial accelerations generated in the perforating explosion process (accelerations can reach 120 g), the planetary roller screw includes a lead screw 312, a transmission nut 311, and eleven planetary rollers 310. The planetary roller screw has good shock resistance and high durability, and maintains relatively high transmission efficiency.

The spline connecting sleeve 301 is meshed with an outer spline at the lower end of the reducer output shaft 206 through an inner spline thereof to receive torque output by the reducer output shaft 206. The spline connecting sleeve 301 is positioned at the upper end of the power output unit. The spline connecting sleeve 301 is externally provided with a fixing ring (middle protruding part). One side of the fixing ring is provided with a thrust bearing 304 and a bearing backing ring 306, and the other side of the fixing ring is provided with a thrust bearing 304, a spline fixing bearing 303 and a spline fixing ring 302. The two thrust bearings 304 play the role of reducing friction and power loss. The spline fixing ring 302, the spline fixing bearing 303 and the bearing packing ring 306 fix the thrust bearings 304 to prevent displacement of the thrust bearings 304.

The spline connecting sleeve 301 sleeves on the lead screw 312. The screw clamping key 305 is inserted between the thrust bearing 304 and the lead screw 312 for fixation. An upper end retaining ring 307 is arranged on the spline connecting sleeve 301 for fixation to prevent falling off.

Both ends of the transmission nut 311 are formed with grooves. A guide flat key 309 is placed inside the groove. A protruding part of the guide flat key 309 is placed inside the guide rail 319. The guide flat key 309 can prevent the transmission nut 311 from rotating itself, so that the transmission nut 311 can only axially moves along the guide rail 319.

An oil-free bushing 313 sleeves on a tail end of the lead screw 312 and is fixed to the screw 312 by a lower end retaining ring 314 to prevent falling off. The oil-free bushing 313 prevents eccentricity of the lead screw for centralization.

On one hand, the transmission nut and the hollow connecting sleeve are in threaded connection. A lower end of the transmission nut 311 is internally provided with a female thread connected with a male thread at an upper end of the hollow connecting sleeve 317. On the other hand, the transmission nut and the hollow connecting sleeve are fastened and connected through fixed parts. The transmission nut and the hollow connecting sleeve are fixedly connected through screws. In this way, the hollow connecting sleeve 317 can be driven by the transmission nut to axially move.

The power output housing is internally provided with a first crash cushion 308 and a second crash cushion 315 at both ends of the guide rail respectively, to prevent parts from being damaged during perforating vibration.

A lower end of the hollow connecting sleeve 317 is formed with two sealing ring grooves, and a sealing ring 316 is placed in the sealing ring groove to ensure the sealing between the power output housing 318 and the hollow connecting sleeve 317 to prevent water from entering the tools to influence the performance of the tool.

A lower end of the hollow connecting sleeve 317 is provided with an external thread in advance to be connected with an adapter of a bridge plug or a packer. The hollow design of the hollow connecting sleeve is more convenient for connection with the adapter. Through the axial movement of the hollow connecting sleeve 317, a thrust or pulling force is generated to allow the bridge plug or the packer to set.

The lead screw rotates forward and reverse through the motor transmission shaft to drive the screw nut to generate axial forward or backward movement, so that the hollow connecting sleeve can also generate axial forward or rearward movement (that is, generate thrust force and pulling force) as the screw nut is connected to the hollow connecting sleeve. Thus, the present disclosure can achieve forward or rearward movement of the operation tool at low cost.

According to the heavy-load push-pull tool provided by the present disclosure, through the transmission design of multiple stages of reducers and the planetary roller screw of the downhole operation tool, low-speed and high-torque power output of the motor is realized. A tool with an outer diameter of 96 mm can output 30 tons of thrust and pulling force. A tool with an outer diameter of 76 mm can output 19 tons of thrust and pulling force. A tool with an outer diameter of 56 mm can output 13 tons of thrust and pulling force. The power output of downhole electric operation is greatly improved.

Moreover, the present disclosure greatly expands the operation range of downhole operation tools. For example, if sleeving cutting is to be performed, the heavy-load push-pull tool is anchored onto the sleeving, and then the operation is performed. When the hollow connecting sleeve at the front of the tool is connected with a slope part, the axial force can be converted into a radial force for cutting the sleeving.

Furthermore, the present disclosure further can realize accurate control for thrust and pulling force of motors and heavy-load tools by a motor control unit. The control module of the motor control unit can obtain the relative positions of the transmission nut and the hollow connecting sleeve based on the rotation speed of the motor and the lead of the lead screw: When the transmission nut and the hollow connecting sleeve move to a set position, the control module sends instructions to the motor drive module, so that the motor stops operating, protecting other parts inside the tool.

The above-described embodiments are preferred examples of realizing the present disclosure, and the present disclosure is not limited to the above-described embodiments. Any non-essential additions or substitutions made by those skilled in the art according to the technical features of the technical solutions of the present disclosure belong to the scope of protection of the present disclosure.

What is claimed is:

1. An electric heavy-load push-pull tool, comprising a power input unit, a power conversion unit and a power output unit,
    wherein the power input unit comprises a motor connected with an external power source, a output shaft of the motor being connected with the power conversion unit through a coupling;
    the power conversion unit comprises a reducer arranged inside a reducer housing, wherein the reducer is provided with multiple stages of planetary reducers; each of the multiple stages of planetary reducers comprises a sun gear, a planetary plate, a planetary carrier and a plurality of planetary gears, each of the plurality of planetary gears is meshed with a gear groove formed in an inner wall of the reducer housing, a sun gear of a first stage of planetary reducer is fixed on a sun gear transmission shaft, each of sun gears of remaining stages of planetary reducers is fixed on a planetary plate, and clearance control shafts coaxial with the sun gear transmission shaft are arranged between planetary plates; and power is input from the sun gear transmission shaft to the first stage of planetary reducer and output from the planetary carrier of a last stage of planetary reducer to a reducer output shaft; and
    the power output unit comprises a power output housing, wherein an inner wall of the power output housing is provided with guide rails, the power output housing is internally provided with a planetary roller screw; the planetary roller screw comprises a lead screw and a transmission nut, the transmission nut is internally provided with a plurality of planetary rollers, the lead screw is connected with the reducer output shaft through a spline connecting sleeve, and the transmission nut is further connected with feather keys embedded in the guide rails; and a hollow connecting sleeve is fixedly connected with the transmission nut, and is driven by the transmission nut to move axially so as to provide thrust force or pulling force for an operation tool;
    the clearance control shafts are arranged between adjacent planetary plates, both end faces of each of the clearance control shafts are spherical surfaces, and an end face of the sun gear transmission shaft is also a spherical surface; contact between the sun gear transmission shaft and a corresponding one of the clearance control shafts and contact between the clearance control shafts both are point contact.

2. The electric heavy-load push-pull tool according to claim 1, wherein the output shaft of the motor is connected with the sun gear transmission shaft through the coupling, a bearing assembly comprising deep groove ball bearings and thrust bearings being arranged between the sun gear transmission shaft and the reducer and a pressure ring is further arranged between a bell bearing pack and the reducer; and
    the ball bearing pack is further arranged between the reducer output shaft and the reducer.

3. The electric heavy-load push-pull tool according to claim 1, wherein one end of the spline connecting sleeve is connected with the reducer output shaft through a spline, an other end of the spline connecting sleeve on the lead screw, and a retaining ring is arranged on the spline connecting sleeve;
    each of both ends of the transmission nut is formed with a groove matched with one side of a corresponding one of the feather keys, the one side of the corresponding one of the feather keys is arranged in the groove, and an other side of the corresponding one of the feather keys is arranged in a corresponding one of the guide rails; and
    the transmission nut and the hollow connecting sleeve are in threaded connection and are fixed by a fixing part.

4. The electric heavy-load push-pull tool according to claim 3, wherein the spline connecting sleeve is externally provided with a fixing ring, one side of the fixing ring is provided with a thrust bearing and a bearing backing ring, and a screw clamping key is inserted between the one of the thrust bearings and the lead screw for fixation; and an other side of the fixing ring is provided with an other of the thrust bearings, a spline fixing bearing and a spline fixing ring;

a tail end of the lead screw is nested into an oil-free bushing and fixed to the oil-free bushing by a retaining ring; and the power output housing is internally provided with crash cushions at both ends of each of the guide rails respectively.

5. The electric heavy-load push-pull tool according to claim 1, wherein power transmission of the power input unit, the power conversion unit and the power output unit is as follows:

power generated by the motor is transmitted to the sun gear transmission shaft through the output shaft of the motor and the coupling, so that the power is transmitted to the power conversion unit;

the sun gear transmission shaft drives a sun gear of the first stage of planetary reducer to rotate and then drives planetary gears meshed with the reducer housing to rotate, movement of the planetary gears drives a planetary plate of a next stage of planetary reducer to rotate, and the planetary plate drives a sun gear fixed on the planetary gear to rotate; after the power is transmitted through one stage of planetary reducer, power torque is increased accordingly; when the power is transmitted to the last stage of planetary reducer, the planetary gear rotates and drives the reducer output shaft to rotate through a planetary carrier so as to provide low-speed and high-torque power output;

the reducer output shaft is connected with the spline connecting sleeve through a spline, and the power is transmitted to the power output unit; the lead screw receives twisting force provided by the spline connecting sleeve and rotates to drive the transmission nut to move axially, wherein guided by the feather keys, the transmission nut only moves axially on the lead screw along the guide rails;

a forward direction of the transmission nut is based on a rotation direction of the motor, and forward rotation or reverse rotation of the output shaft of the motor drives the transmission nut to move forward or backward through power transmission; and the hollow connecting sleeve is provided with a plurality of operation tool connecting interfaces, and the operation tool is fixedly connected with the hollow connecting sleeve; and the hollow connecting sleeve fixedly connected with the transmission nut is driven by the transmission nut to move axially so as to apply axial pulling force or thrust force to the operation tool.

6. The electric heavy-load push-pull tool according to claim 1, wherein the motor is further connected with a motor control unit, wherein the motor control unit comprises a control module, and a communication module, a collection module, a motor drive module and a power supply module which are connected with the control module;

wherein the communication module is configured for real-time communication between the motor control unit and an external control panel;

the control module is configured to receive a control signal of the external control panel through the communication module to send instructions to each module, and feed motor operation parameters back to the external control panel;

the collection module is configured to collect operation parameters including rotation speed, rotation direction, voltage and current of the motor in real time, and send the operation parameters to the control module;

the motor drive module is configured to receive instructions from the control module and adjust the operation parameters of the motor; and the power supply module is configured to convert supply voltage into operation voltage required by each module and the motor.

7. The electric heavy-load push-pull tool according to claim 6, wherein the control module is able to obtain relative positions of the transmission nut and the hollow connecting sleeve based on the rotation speed of the motor and a lead of the lead screw; and when the transmission nut and the hollow connecting sleeve move to set positions, the control module sends instructions to the motor drive module, stopping the motor.

8. The electric heavy-load push-pull tool according to claim 1, wherein a brake fixing hole is further formed in the motor, and a brake mechanism is connected with the motor through the brake fixing hole and a fixing part; and when braking, the brake mechanism locks a rotating shaft of the motor.

9. The electric heavy-load push-pull tool according to claim 1, wherein the motor is arranged in a motor cushioning sleeve, both ends of an outer wall of the motor cushioning sleeve is formed with sealing ring grooves into which motor cushioning sleeve sealing rings are arranged;

the motor and the motor cushioning sleeve are arranged inside a power input housing, and the motor is connected with a motor input housing through a motor fixing hole and a fixing part; and the power input housing is formed with sealing ring grooves into which power input housing sealing rings are arranged.

10. The electric heavy-load push-pull tool according to claim 5, wherein the output shaft of the motor is connected with the sun gear transmission shaft through the coupling, a bearing assembly comprising deep groove ball bearings and thrust bearings being arranged between the sun gear transmission shaft and the reducer and a pressure ring is further arranged between a ball bearing pack and the reducer; and the ball bearing pack is further arranged between the reducer output shaft and the reducer.

11. The electric heavy-load push-pull tool according to claim 5, wherein one end of the spline connecting sleeve is connected with the reducer output shaft through a spline, an other end of the spline connecting sleeve on the lead screw, and a retaining ring is arranged on the spline connecting sleeve;

each of both ends of the transmission nut is formed with a groove matched with one side of a corresponding one of the feather keys, the one side of the corresponding one of the feather keys is arranged in the groove, and an other side of the corresponding one of the feather keys is arranged in a corresponding one of the guide rails; and the transmission nut and the hollow connecting sleeve are in threaded connection and are fixed by a fixing part.

12. The electric heavy-load push-pull tool according to claim 11, wherein the spline connecting sleeve is externally provided with a fixing ring, one side of the fixing ring is provided with a thrust bearing and a bearing backing ring, and a screw clamping key is inserted between the one of the thrust bearings and the lead screw for fixation; and an other side of the fixing ring is provided with an other of the thrust bearings, a spline fixing bearing and a spline fixing ring;

a tail end of the lead screw is nested into an oil-free bushing and fixed to the oil-free bushing by a retaining ring; and the power output housing is internally provided with crash cushions at both ends of each of the guide rails respectively.

\* \* \* \* \*